(12) United States Patent
Keith

(10) Patent No.: US 6,632,142 B2
(45) Date of Patent: Oct. 14, 2003

(54) INTERNET GAMING WITH MULTIPLE WEB SITES

(76) Inventor: Christopher Keith, 105 Hudson St. Apt. 5S, New York, NY (US) 10013

(*) Notice: Subject to any disclaimer, the term of this patent is extended or adjusted under 35 U.S.C. 154(b) by 26 days.

(21) Appl. No.: 09/919,300

(22) Filed: Jul. 31, 2001

(65) Prior Publication Data

US 2003/0032480 A1 Feb. 13, 2003

(51) Int. Cl.[7] ............................................... A63F 9/22
(52) U.S. Cl. ......................................................... 463/42
(58) Field of Search .......................... 463/42, 43; 700/91, 700/92

(56) References Cited

U.S. PATENT DOCUMENTS

| 6,007,426 | A | 12/1999 | Kelly et al. |
| 6,074,299 | A | 6/2000 | Cohen |
| 6,102,406 | A | 8/2000 | Miles |
| 6,406,371 | B1 * | 6/2002 | Baba et al. ............ 463/42 |
| 2002/0115488 | A1 * | 8/2002 | Berry ...................... 463/42 |

* cited by examiner

Primary Examiner—Thomas N. Moulis
(74) Attorney, Agent, or Firm—Brenda Pomerance (57) ABSTRACT

A home site operates a game involving player visits to play sites, to view information at the play sites and possibly to perform additional activity at the play sites. Play sites are selected in accordance with interests of a game player and/or because characteristics of a game player satisfy desired player characteristics associated with the play site. The play site game activity, performed to participate in the game, may be viewing information at the play site, or pseudo-buying an item at the play site. In some games, member icons are provided to players, and the players must find the member icons at the play sites. After an icon is found, communication between the player and member is enabled.

32 Claims, 4 Drawing Sheets

INTERNET GAMING WITH MULTIPLE WEB SITES

BACKGROUND OF THE INVENTION

The present invention relates to game playing on the Internet, and more particularly, is directed to a system having a home web site and affiliated web sites wherein the games require players to visit at least selected ones of the affiliated web sites.

Game playing is a very popular pastime. The Internet facilitates multi-player gaming, which is particularly satisfying for certain game players. It is well known that habitual game players often spend a lot of time in game playing and are actively engaged in the game scenarios.

The Internet has also proved useful for business advertising. There are many Internet-based schemes for attracting visitors to web sites, such as banner ads, hyperlinks on affiliated web sites, web sites that offer "tours" of other web sites in which the user passively watches a sequence of pages from different web sites, and so on. However, as the novelty of the Internet wears off, businesses are finding that so-called "click through" rates, such as how a user clicks on a banner ad to go to the advertiser's web site, experience large decreases.

Accordingly, there is room to make use of the factors that engage people in Internet-based gaming to improve the effectiveness of Internet-based advertising.

SUMMARY OF THE INVENTION

In accordance with an aspect of this invention, there is provided a method of operating a game, comprising enabling performance of game activity at a home site, and reflecting, at the home site, game activity performed at a play site.

The play site is selected from a list of play sites provided by the home site at the start of the game, in accordance with interests of a game player and/or because characteristics of a game player satisfy desired player characteristics associated with the play site. The home site game activity may be answering a question about information provided at the play site. The play site game activity may be viewing information at the play site, or pseudo-buying an item at the play site.

In accordance with an aspect of this invention, there is provided a method of pseudo-buying, comprising receiving, at a web site, actions for purchasing a good or service, automatically determining that the purchase is part of a game, and automatically preventing the purchase actions from resulting in an actual purchase transaction.

The determining may include examining a cookie automatically provided by the purchaser's web browser to the web site, or examining information manually provided by the purchaser to the web site as part of the purchasing actions, or searching for the purchaser on a list provided from another web site.

In accordance with an aspect of this invention, there is provided a method of operating a game, comprising providing, from a home site to a player, a list of play sites and a member icon associated with a member, and receiving, at the home site, an indication that the player found the member icon at one of the play sites.

After the indication is received, communication between the player and the member may be enabled. Additionally, a group clue may be provided from the home site to the player so the player can determine whether the member is part of a group including the player.

In accordance with an aspect of this invention, there is provided a method of enabling game playing, comprising receiving input from a player at a play site selected from a list of play sites, the list being provided from a home site to the player, and automatically acting to produce a result for a game at the home site.

It is not intended that the invention be summarized here in its entirety. Rather, further features, aspects and advantages of the invention are set forth in or are apparent from the following description and drawings.

DETAILED DESCRIPTION

The present invention motivates game players to visit play web sites to find information or perform activities in order to win a game at a home site. Accordingly, players are actively viewing the pages of the play web sites, not merely passively being presented with web pages. Additionally, some games require the player to perform an activity, such as purchasing an item intended only for the game and understood as not being an actual purchase. However, at the conclusion of the game, the web site may offer the pseudo-purchased item at a price discount, to encourage an actual purchase. It is believed that pseudo-purchasing combined with the price discount increases actual purchase likelihood beyond that motivated by the discount alone. Thus, players enjoy the fun of game playing, while businesses have a more effective advertising mechanism.

The present invention is applicable to competitive games, that is, games with a single winner, traditional one-on-one contests requiring deduction or knowledge of some field; to social experience games, that is, games in which the pay centers around forming relationships, such as a scavenger hunt for people; and to non-competitive experiences, that is, challenges that may result in merit badges, ratings and/or diplomas for the player. Examples include:

scavenger hunts wherein players must fetch items from participating sites, such as by clicking on an icon of the item or by engaging in a fictitious purchase of the item;

shopping contests wherein players compete against each other as to who can find the best price in a given time interval;

bingo where visits to appropriate play sites generate tokens for a bingo card, that is, a visit puts a token in a cell of the bingo card;

quizzes relating to specialized information;

word puzzles or labyrinths, where play site visits provide clues or tokens for playing the game at the home site;

mystery/treasure hunts where players vie to find a single answer;

a Monopoly (TM)—like game wherein a play site visit is required to enable a player's turn;

people games where the game object is to form relationships with other game players; and training games that help players develop expertise in an area.

Figure 1:
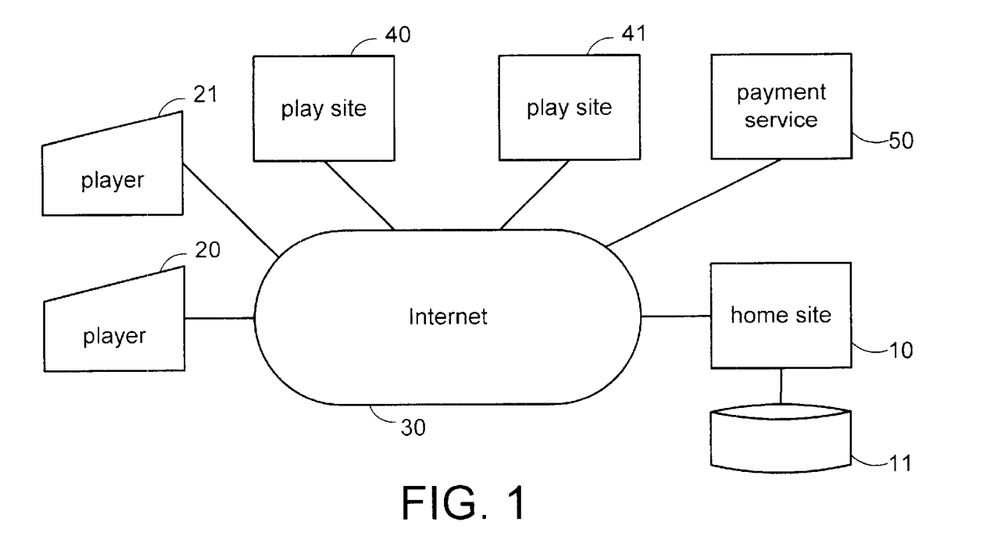
FIG. 1 is a block diagram of the hardware configuration in which the present invention is applied.

Referring now to the drawings, and in particular to FIG. 1, there is illustrated a block diagram of the hardware configuration in which the present invention is applied. FIG. 1 shows home web site 10, data storage 11, players 20 and 21, data communication network 30, play web sites 40 and 41, and payment service 50.

Home web site 10 includes data storage 11. Home site 10 is a general purpose computer programmed to function as a web server, that is, to accept requests from the Internet, and to respond accordingly, such as by providing a web page to the requester and/or updating its internal files, such as player and web site registration files stored on data storage 11. Home site 10 is coupled to data communication network 30, such as the Internet, via a suitable wireline or wireless communication channel.

Players 20 and 21 are each a general purpose computer, such as a personal computer, personal digital assistant (PDA) or other suitable computing device, coupled to Internet 30 via a suitable wireline or wireless communication channel. Players 20 and 21 may have different hardware configurations.

Play web sites 40 and 41 are coupled to Internet 30. Each of play sites 40 and 41 is a general purpose computer programmed to function as a web server, with appropriate storage and communication facilities.

Payment service 50 is a general purpose computer programmed to enable online payment transactions and to appropriately record the payment transactions, as described below. Payment service 50 includes appropriate storage and communication facilities.

Play sites 40, 41 are affiliated with home site 10 according to a variety of configurations. In one configuration, play site 40 includes a hyperlink to home site 10. In another configuration, play site 40 appears to be the originator of a game, that is, home site 10 is providing games as a private label service for play site 40, generally according to a so-called application server processing (ASP) model. In yet another configuration, play site 40 uses payment service 50 for fulfillment of its payment transactions, and payment service 50 checks whether home site 10 is entitled to referral payment for transactions processed by payment service 50. Payment service 50 uses a suitable checking technique, such as comparing the purchaser with a list of game players, or accepting a coupon from the purchaser that identifies the purchaser as a game player.

Figure 2:
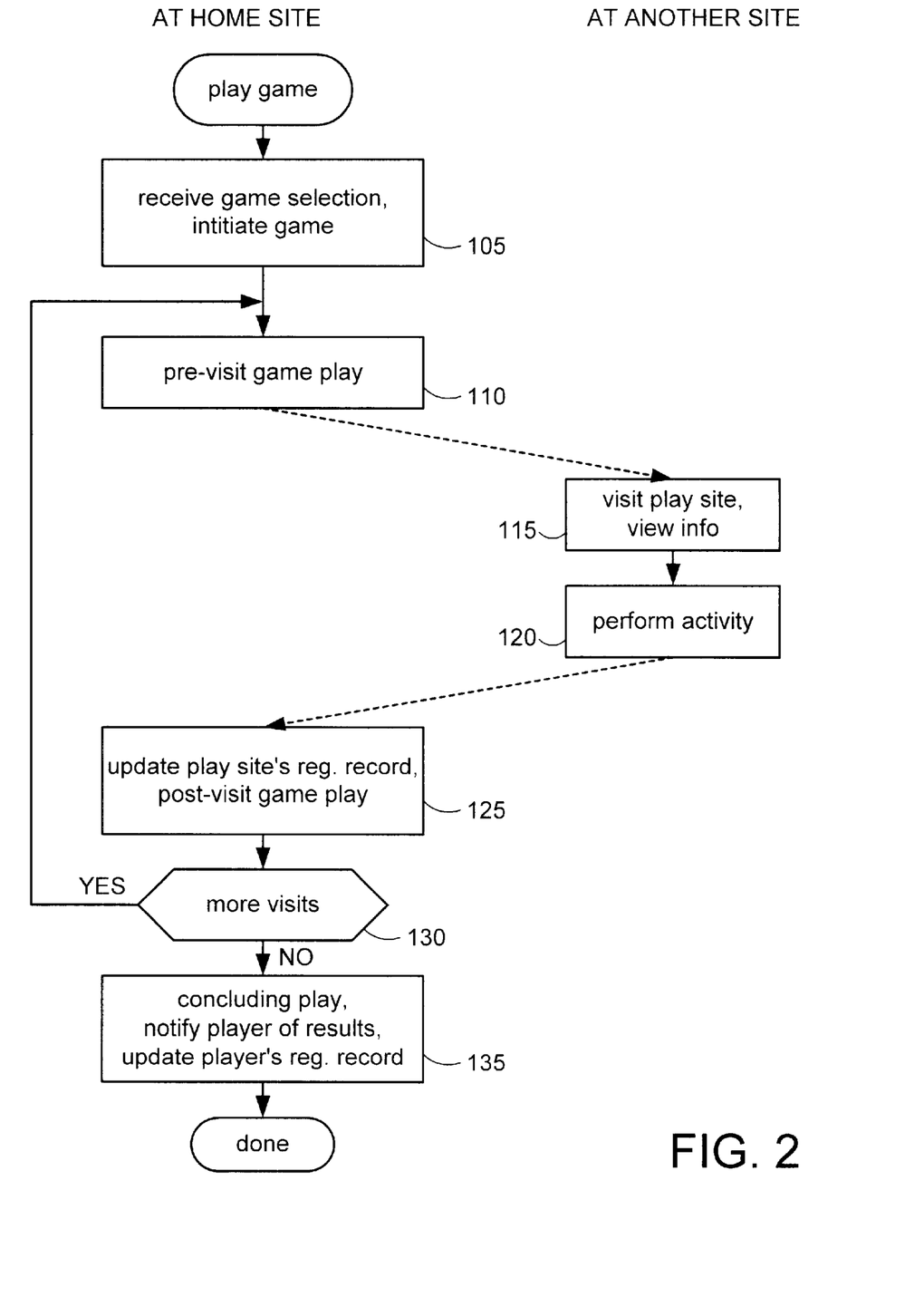
FIG. 2 is a flowchart showing a general procedure for a game according to the present invention.

FIG. 2 is a flowchart showing a general procedure for a game according to the present invention.

Before operation according to FIG. 2, it is assumed that registration activities have been accomplished by players 20 and 21 and by play sites 40 and 41. At the completion of registration, storage 11 contains registration information for players and for play sites.

Player registration information includes a player identification name to be used at home site 10, such as "Superplayer2001", a password, and optionally interest information, factual information and usage information. Interest information indicates what the player is interested in, such as hobbies, current events and so on. Factual information provides information about the player, such as demographic information and personal facts used as part of certain games, for example, that this player went on a charity fundraising 10 mile walk in 1998. Usage information provides statistics regarding the player's usage of home site 10 and game performance.

Play site registration information includes an administrator identification name, a password, the address of the play site, such as "www.superflowers.com", information describing the web site's information and activities that it wishes to promote, information regarding the desired demographics of web site visitors, and administrative information such as types of games the web site wishes to be included in, games being operated on behalf by home site 10 on behalf of the play site and their frequency of operation, and so on.

At step 105, home site 10 receives, via Internet 30, a game play request from player 20. Home site 10 initiates a game, such as by invoking a copy of a game program and running the copy in association with information from player 20, or other suitable programming methodology. A game may span one or more Internet usage sessions of a player. In some cases, home site 10 selects a game for player 20 based on the interests of player 20 as reflected in the registration information for player 20 and/or the desirable demographics profile of web site visitors requested by the play web sites.

At step 110, home site 10 executes optional pre-visit game playing instructions. Typically, home site 10 will provide game specific starting information to player 20, such as the game rules, game objective and a list of one or more play sites that must be visited to complete the game. The game objective is determined, at least in part, by what the play sites wish to promote at their web sites.

Home site 10 provides information to player 20 according to an appropriate communication mode, determined by home site 10 or by player 20 or by home site 10 and player 20, such as a display on a web page, an electronic mail message, a voice mail message, a facsimile message or other mode. Table 1 shows an example of a list of play sites.

TABLE 1 www.upscale-jewelry.com
www.reliable-home-improvements.com
www.superflowers.com
www.impressive-greetings-online.com
www.socialcare.net It will be appreciated that the list of play sites may contain numerous entries. In practice, the play site is usually a list of hyperlinks accessible from an email or from a web page. As other web site access methods are developed, the play site lists may use such access methods, for example, abbreviations used in wireless communication.

Home site 10 populates the play site list for player 20 based on the interests of player 20 as reflected in the registration information for player 20 and/or the desirable demographics of web site visitors requested by the play sites.

At step 115, player 20 selects at least one of the play sites, such as play site 40, and visits play site 40 to take an action for the purpose of producing a result at home site 10. Player 20 takes the action of viewing information at play site 40 to accomplish the game objective at home site 10. Since player 20 is engaged in viewing play site 40, an advertising objective of driving traffic to play site 40 has been accomplished. In some embodiments, the hyperlinks associated with the list of play sites made available by home site 10 for player 20 include information identifying player 20, to facilitate usage accounting. For some games, play site 40 need not be modified at all to enable its participation in a game.

In some embodiments, home site 10 may direct advertising to play site 40 for viewing by player 20. That is, visiting play site 40 and examining its information puts player 20 in a particular mental frame appropriate for certain types of ads. For example, if play site 40 depicts a vacation resort, then advertising for golf clubs may be suitable. Play site 40 typically earns compensation by displaying the ad to player 20. The compensation is paid by home site 10 and/or the advertiser.

At step 120, which may be omitted from some games depending on their rules, player 20 performs an additional activity to accomplish the game objective. Since player 20 is actually using play site 40 to perform an activity, it will be appreciated that player 20 is engaged to a far greater level than is possible with conventional advertising, that is, conventional advertising is passive, whereas the instant game actively involves player 20. Generally, play site 40 configures itself to accommodate play activity, such as by providing fictitious items for game purchase, by allowing player 20 to make a game-related posting on play site 40, or by enabling player 20 to pseudo-buy an item that is for sale.

As used herein and in the claims, "pseudo-buying" refers to taking steps needed to purchase an item, with some aspect of the pseudo-buying process being configured so that a real purchase transaction is prevented from occurring. Pseudo-buying may be accomplished using a "game coupon" submitted from player 20 to play site 40 during the purchase transaction. Pseudo-buying may be accomplished by checking the "cookie" supplied from player 20's web browser to play site 40, and having play site 40 adjust the purchase amount to zero when the cookie identifies the party as a game player. Pseudo-buying may be accomplished by having play site 40 look up the purchaser in a list maintained by home site 10. Other methods to pseudo-buy will be apparent to those of ordinary skill in the art.

At step 125, home site 10 updates player 20's records to reflect activity at step 120. If appropriate for the specific game being played, home site 10 also interacts with player 20, such as by receiving information from player 20 relating to activity at step 110.

In some embodiments, post-visit game play includes presenting questions from home site 10 to the game player relating to aspects of the play site. The responses from the player are comparative data about the play site and part of game playing.

At step 130, home site 10 determines whether more visits to play sites are required, and if so returns to step 110. It will be appreciated that, for some games, control over the number of web sites visited may reside with player 20 instead of with home site 10.

If no more play site visits are required, at step 135, home site 10 executes optional concluding game playing instructions, notifies player 20 of the results of the game play, and updates player 20's registration information to reflect that the game was played and what its results were.

In some embodiments, concluding game play includes presenting questions from home site 10 to the game player relating to his/her evaluation of the usability of the play sites visited. The responses from the player are comparative data about the play sites.

Games include one or more of pre-visit game play 110, post-visit game play 125, and concluding play 135.

In one type of game, player 20 is given a "play board" at home site 10 showing the game objective and the player's progress so far. To advance, player 20 must do one of the following: (i) find the right play site and register there; (ii) pseudo-buy the right item, possibly for the right price; (iii) meet the right person; or (iv) find the right play site and advertising information. In some games, player 20 must additionally take an action at home site 10 after performing one of the aforementioned actions.

As a specific example, a scavenger hunt game offers a prize, such as cash, goods or services, for finding: (a) what Citizen Kane wanted, (b) what Linus needs, and (c) what the Wizard of Oz gave the scarecrow, at play sites selected from a list of play sites. Player 20 examines the list of play sites to detect those that are likely to contain the items satisfying the questions, and visits the sites. For instance, player 20 decides that "blanket" is what Linus needs, selects www.super-bedroom-stuff.com as a likely play site for finding a blanket, visits the selected play site, finds a logo for home site 10 next to one of the blankets, clicks the logo, is returned to home site 10 and is greeted by a congratulatory notice that item (b) has been found. When player 20 finds all items, possibly in competition with other players, player 20 wins the game.

As another example, player 20 clicks on play site 40 from his or her list of play sites, browses at play site 40 for a predetermined time or for as long as player 20 desires, depending on the rules of the game, returns to home site 10 and is presented with a question, such as, "identify the one of these items that is sold at play site 40." Player 20 earns game points for correctly identifying the item.

As another example, a bingo game offers a prize for completing a row or a diagonal on a bingo card provided at home site 10. Table 2 shows a sample bingo card that is displayed to player 20; each cell of the bingo card contains a clue. Player 20 uses the clue to determine which play site to visit, and clicks on the game site icon (or logo) at a play site on the list of play sites to earn a token on the relevant cell of their bingo card. When player 20 has earned tokens in a column or row or diagonal, possibly in competition with other players, then player 20 wins the bingo game.

TABLE 2

| Adam's Rib | Time's Hope | Sleep's End | Tough Timer | Noble Reader |
| Herald Harold | Enzyme Cavern | Auction Bayer | Rigid Midget | Hip Hopper |
| Beast Feast | Iron Angel | Stewing Mary | Small Mall | Tiger's Tiger |
| Easy Dream | Starry Planet | Baby Brawler | Dove's Duty | Under Easy |
| Final Triad | Heaven Loser | Orange Bruise | Lady Warrior | City Dozen |

As another example, a game requires a player to pseudo-buy $1,000 of products at each play site on a list of play sites, within a predetermined time interval.

Figure 3:
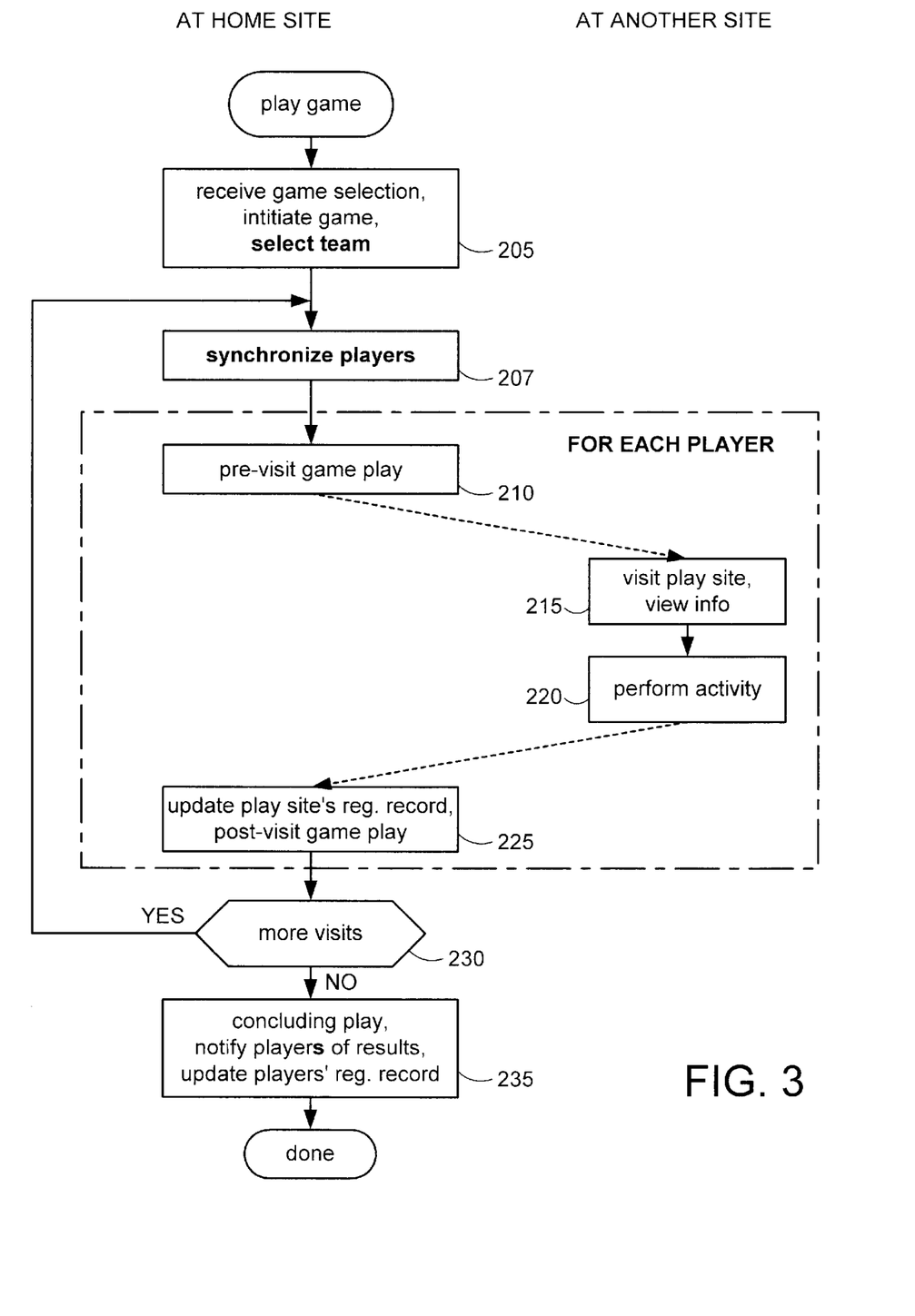
FIG. 3 is a flowchart showing a type of multi-player game according to the present invention.

FIG. 3 is a flowchart showing a type of multi-player game according to the present invention. FIG. 3 is generally similar to FIG. 2, and for brevity, only major differences are discussed below.

At step 205, home site 10 receives, via Internet 30, a game play request from player 20. Home site 10 initiates a multi-player game via a suitable programming methodology. In some embodiments, home site 10 selects a team of players. In other embodiments, players choose their own teammates. It will be appreciated that there may be a waiting period until a minimum number of players have indicated interest in playing. For example, in one game, player 20 play competitively against player 21. In another game, players 20 and 21 play co-operatively to accomplish a game objective.

At step 207, home site 10 synchronizes the players. Before any game playing occurs, synchronization may involve little or no activity. During the course of game playing, synchronization generally involves notifying each player of all or part of what other players are doing, such as players on the same team and/or opposing teams. In some embodiments, synchronizing refers to providing information or game privileges gleaned or earned by one player to all team members. In other embodiments, synchronizing refers to updating scores of players and/or a team to reflect the team's activity. Other types of synchronizing may be employed depending on the type of game being played.

Steps 210–225 are generally similar to steps 110–125. It will be appreciated that details differ, depending on the nature of the game.

At step 230, home site 10 determines whether more visits to play sites are required, and if so returns to step 207. It will be appreciated that, for some games, control over the number of web sites visited may reside with player 20 instead of with home site 10.

If no more play site visits are required, at step 235, home site 10 executes optional concluding game playing instructions, notifies the players of the results of the game play, and updates the player's files to reflect that the game was played and what its results were.

Figure 4:
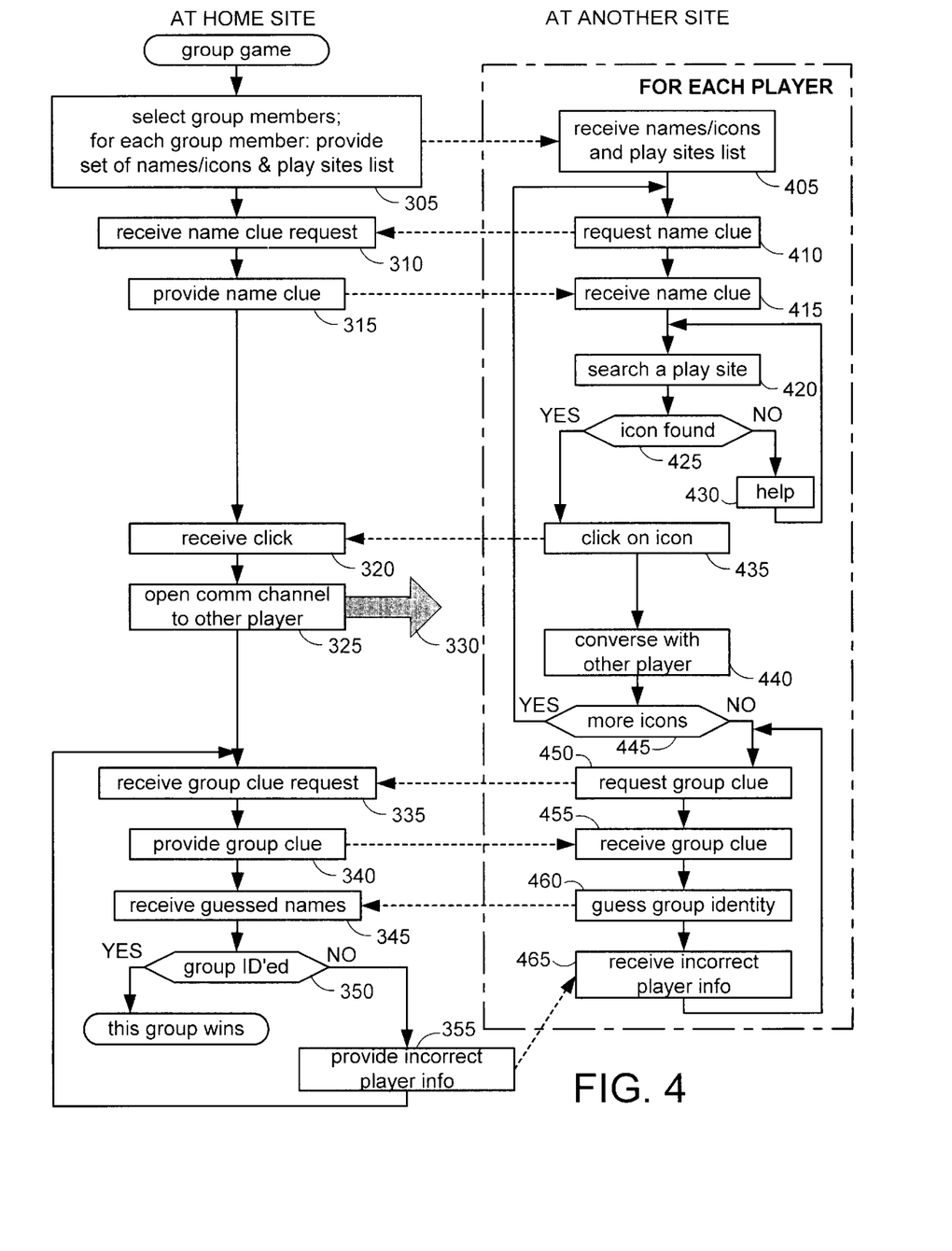
FIG. 4 is a flowchart showing another type of multi-player game according to the present invention.

FIG. 4 is a flowchart showing another type of multi-player game according to the present invention. Steps 305–355 are performed by home site 10. Steps 405–465 are performed generally independently by each player. Generally, the game consists of a name identification phase followed by a group identification phase. In the name identification phase, players first try to find other the icons for other players located at the play sites. In the group identification phase, players try to guess which of the identified players are on their team.

At step 305, home site 10 receives, via Internet 30, respective game play requests from multiple players. Home site 10 initiates a game, such as by invoking a copy of a game program and running the copy in association with information from the players, or other suitable programming methodology. For this type of game, home site 10 sends a player/icon chart 500 to each player, and a list of play sites, and assigns players to teams. A different instance of chart 500 may be sent to each player, or all players on a team may receive the same chart 500.

Figure 5:
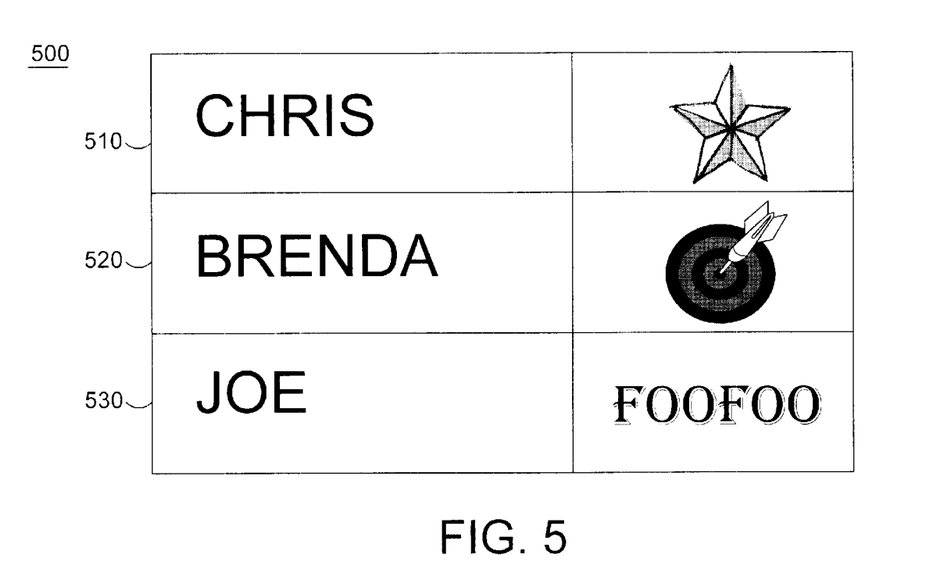
FIG. 5 illustrates player/icon chart 500.

FIG. 5 shows player/icon chart 500 as consisting of a series of records. Each record includes a player name and the icon associated with the player. Record 510 indicates that player name "CHRIS" is associated with a faceted star icon. Record 520 indicates that player name "BRENDA" is associated with an arrow embedded in a bull's eye target. Record 530 indicates that player name "JOE" is associated with the word "FOOFOO" in a fanciful typeface. It will be appreciated that chart 500 may contain numerous records.

At step 405, player 20 receives player/icon chart 500 and the list of play sites. At step 410, player 20 requests a name clue from home site 10.

At step 310, home site 10 receives the name clue request from player 20. At step 315, home site 10 provides a name clue to player 20. For example, if the faceted star icon for player "CHRIS" is at the play site "www.superflowers.com", the name clue might be

"HEAVENLY BLOOMS BRIGHTEN YOUR DAY"

Although in this example, the name clue is textual, in some cases the name clue may be visual or audible or a combination thereof.

At step 415, player 20 receives the name clue. At step 420, player 20 picks a web site from the play web site list, such as play site 40, and searches play site 40 for one of the icons on chart 500. At step 425, player 20 determines whether an icon on chart 500 has been found. If not, at step 430, player 20 invokes help procedure 430. When an icon is found on a web page of play site 40, at step 435, player 20 clicks on the icon. Play site 40 notifies player 20 that a message has been sent to home site 10 as a consequence of the click identifying player 20 and the icon.

Help procedure 430 varies depending on the game. In some games, asking for help provides another clue for the same icon, such as

"BLOSSOMS CONCEAL AN ASTRAL OBJECT"

In other games, asking for help may cause the player's player/icon chart 500 to be revised, akin to taking a new card from a deck of cards. In other games, other suitable processing is performed. At the conclusion of help procedure 430, processing returns to step 420.

At step 320, home site 10 is notified that player 20 clicked on a specific icon. At step 325, home site 10 opens communication channel 330 between player 20 and the player associated with the icon, such as player 21. Communication channel 330 may be a live messaging path, such as America Online's instant messaging facility or ICQ facility, may be an e-mail or may be a posting on an electronic bulletin board. In some embodiments, communication channel 330 allows player 20 to access a repository of facts about player 21.

At step 440, player 20 uses just-created communication channel 330 to converse with player 21, enabling each player to learn facts about the other player. These facts are used during the group identification phase of the game, described below.

At step 445, player 20 checks whether there are more icons on player/icon chart 500. If so, processing returns to step 410. When player 20 has conversed with all players associated with the icons on chart 500, player 20 has completed the name identification phase of the game and proceeds to step 450.

At step 450, player 20 requests a group clue from home site 10.

At step 335, home site 10 receives the group clue request from player 20. At step 340, home site 10 provides a group clue to player 20. In some game embodiments, visits to play sites are required to obtain group clues. An example of a group clue is:

"ONE WALKS FOR ALL, ONE WON THREE IN ONE, ONE BEGAT FIVE."

Here, one player on the team has engaged in a fund-raising walk, another player won three awards during the year 2001, and another player has five grandchildren. During the conversations between players, these facts should be elicited by player 20.

At step 460, player 20 uses the group clue to guess the identity of members of their group, and sends a message to home site 10 containing the guessed names of the player's group, such as "JOE, FRANCIS, STEVE, SALLY".

At step 345, home site 10 receives the guessed group list. At step 350, home site 10 checks whether the group was properly identified. If so, then this group has won the game. If the group was not correctly identified, at step 355, home site 10 indicates to player 20 that the group members were incorrectly identified. In some embodiments, home site 10 sends a message to player 20 such as, "GROUP NOT YET IDENTIFIED". In other embodiments, home site 10 sends a message to player 20 such as, "STEVE, SALLY are in your group, but JOE, FRANCIS are not in your group."

At step 465, player 20 receives the incorrect player information and processing returns to step 450 to obtain another clue. In other embodiments, after receiving the incorrect player information, processing returns to step 460 for another guess. In still other embodiments, player 20 controls whether more group clues will be provided. For example, player 20 may elect to further converse with some of the players included in chart 500 and try more guesses before requesting another clue.

As a specific example, a game offers a prize for finding a group comprising: (a) a woman to whom flies has a special meaning, (b) an executive who loves P. G. Wodehouse, (c) a man who got married on your birthday, (d) a classmate of yours who loves bowling, and (e) a doctor who paints. In a first game phase, home site 10 provides player 20 with a list of clues for, say, ten people. Player 20 completes the first game phase by establishing communication with the ten people. In the second game phase, player 20 attempts to select, from the ten identified people, a group of five people having characteristics (a)–(e). In this game, the ten people each belong to one of two groups of five people, and the group that first identifies itself wins.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A method of operating a game, comprising:
   enabling performance of game activity at a home site,
   selecting at least one play site based on a characteristic of a game player, the characteristic being other than interest in a specific game, and
   reflecting, at the home site, game activity performed at the play site.

2. The method of claim 1, wherein the home site game activity occurs before the play site game activity.

3. The method of claim 1, wherein the home site game activity occurs after the play site game activity.

4. The method of claim 1, wherein the play site is selected from a list of play sites provided by the home site at the start of the game.

5. The method of claim 1, wherein the characteristic of the game player is an interest of the game player.

6. The method of claim 1, wherein the characteristic of the game player satisfies a desired player characteristic specified by the play site.

7. The method of claim 1, wherein the play site game activity is in accordance with specified desired activity associated with the play site.

8. The method of claim 1, wherein the home site game activity is answering a question about information provided at the play site.

9. The method of claim 1, wherein the play site game activity is viewing information at the play site.

10. A method of operating a game, comprising:
    enabling performance at a home site of pseudo-buying an item at a play site, and
    reflecting, at the home site, pseudo-buying of the item at the play site.

11. The method of claim 10, wherein pseudo-buying includes examining a cookie automatically provided by a purchaser's web browser to the play site.

12. The method of claim 10, wherein pseudo-buying includes examining, at the play site, information manually provided by a purchaser.

13. The method of claim 10, wherein pseudo-buying includes searching for a purchaser on a list provided from the home site.

14. The method of claim 1, further comprising synchronizing, at the home site, players that are part of a team.

15. A method of pseudo-buying, comprising:
    receiving, at a web site, actions for purchasing a good or service,
    automatically determining that the purchase is part of a game, and
    automatically preventing the purchase actions from resulting in an actual purchase transaction.

16. The method of claim 15, wherein the determining includes examining a cookie automatically provided by the purchaser's web browser to the web site.

17. The method of claim 15, wherein the determining includes examining information manually provided by the purchaser to the web site as part of the purchasing actions.

18. The method of claim 15, wherein the determining includes searching for the purchaser on a list provided from another web site.

19. A method of operating a game, comprising:
    providing, from a home site to a player, a list of play sites and a member icon associated with a member; and
    receiving, at the home site, an indication that the player found the member icon at one of the play sites.

20. The method of claim 19, wherein the indication is received from the play site containing the member icon.

21. The method of claim 19, further comprising enabling communication between the player and the member after the indication is received.

22. The method of claim 19, wherein the list of play sites is selected in accordance with interests of the player.

23. The method of claim 19, wherein at least one of the play sites on the list is selected because characteristics of the player satisfy desired player characteristics associated with the play site.

24. The method of claim 19, further comprising providing a group clue from the home site to the player so the player can determine whether the member is part of a group including the player.

25. A method of enabling game playing, comprising:
    receiving input from a player at a play site selected from a list of play sites, the list being based on a characteristic of the player, the characteristic being other than interest in a specific game, the list being provided from a home site to the player, and
    automatically acting to produce a result for a game at the home site.

26. The method of claim 25, wherein the characteristic is an interest of the player.

27. The method of claim 25, wherein the characteristic of the player satisfies a desired player characteristic specified by the play site.

28. A method of enabling game playing, comprising:
    receiving input from a player at a play site selected from a list of play sites, the list being provided from a home site to the player, and
    automatically acting to produce a result for a game at the home site, wherein the input received at the play site is for pseudo-buying an item at the play site.

29. The method of claim 28, wherein pseudo-buying includes examining a cookie automatically provided by a purchaser's web browser to the play site.

30. The method of claim 28, wherein pseudo-buying includes examining, at the play site, information manually provided by a purchaser.

31. The method of claim 28, wherein pseudo-buying includes searching for a purchaser on a list provided from the home site.

32. The method of claim 25, wherein the input received from the player is related to an icon displayed at the play site, and the automatically acting includes sending a message from the play site to the home site indicating that the player provided input related to the icon.

* * * * *